United States Patent [19]

Shipman

[11] Patent Number: 4,539,256
[45] Date of Patent: Sep. 3, 1985

[54] MICROPOROUS SHEET MATERIAL, METHOD OF MAKING AND ARTICLES MADE THEREWITH

[75] Inventor: Gene H. Shipman, Cottage Grove, Minn.

[73] Assignee: Minnesota Mining and Manufacturing Co., St. Paul, Minn.

[21] Appl. No.: 583,288

[22] Filed: Feb. 28, 1984

Related U.S. Application Data

[63] Continuation-in-part of Ser. No. 416,140, Sep. 9, 1982, abandoned.

[51] Int. Cl.$^3$ .......................... B29D 27/04; B32B 3/10
[52] U.S. Cl. ................................ 428/315.5; 156/229; 264/41; 264/49; 428/317.9; 428/318.4; 428/319.1
[58] Field of Search ................ 156/229; 264/41, 49; 428/315.5, 315.7, 315.9, 316.6, 317.9, 318.4, 319.1

[56] References Cited

U.S. PATENT DOCUMENTS

| | | | |
|---|---|---|---|
| 3,201,364 | 8/1965 | Salyer | 524/474 |
| 3,214,501 | 10/1965 | Strauss | 264/49 |
| 3,539,374 | 11/1970 | Isaacson | 428/315.7 |
| 3,640,829 | 2/1972 | Elton | 428/315.7 |
| 3,679,540 | 7/1972 | Zimmerman et al. | 428/265 |
| 3,793,060 | 2/1974 | Weininger | 428/315.7 |
| 3,870,593 | 3/1975 | Elton | 428/315.5 |
| 3,953,566 | 4/1976 | Gore | 264/288 |
| 3,962,153 | 6/1976 | Gore | 521/79 |
| 4,096,227 | 6/1978 | Gore | 264/289 |
| 4,100,238 | 7/1978 | Toshihiko | 264/49 |
| 4,110,392 | 8/1978 | Yamazaki | 264/127 |
| 4,187,390 | 2/1980 | Gore | 174/102 R |
| 4,194,041 | 3/1980 | Gore et al. | 428/315.5 |
| 4,197,148 | 4/1980 | Shinomura | 156/79 |
| 4,206,980 | 6/1980 | Krueger et al. | 350/359 |
| 4,247,498 | 1/1981 | Castro | 264/41 |

FOREIGN PATENT DOCUMENTS

2026381A 2/1980 United Kingdom .

*Primary Examiner*—William J. Van Balen
*Attorney, Agent, or Firm*—Donald M. Sell; James A. Smith; Richard Francis

[57] ABSTRACT

A method of making a microporous material is provided which comprises the steps of melt blending crystallizable thermoplastic polymer with a compound which is miscible with the thermoplastic polymer at the melting temperature of the polymer but phase separates on cooling at or below the crystallization temperature of the polymer, forming a shaped article of the melt blend, cooling the shaped article to a temperature at which the polymer crystallizes to cause phase separation to occur between the thermoplastic polymer and the compound to provide an article comprising a first phase comprising particles of crystallized thermoplastic polymer in a second phase of said compound, orienting the article in at least one direction to provide a network of interconnected micropores throughout. The microporous article comprises about 30 to 80 parts by weight crystallizable thermoplastic polymer and about 70 to 20 parts by weight of the compound. The oriented article has a microporous structure characterized by a multiplicity of spaced randomly dispersed, equiaxed, non-uniform shaped particles of the thermoplastic polymer which are coated with the compound. Adjacent thermoplastic particles within the article are connected to each other by a plurality of fibrils consisting of the thermoplastic polymer. The fibrils radiate in three dimensions from each particle. The compound may be removed from the sheet article, e.g., by solvent extraction. The preferred article is a sheet material.

29 Claims, 6 Drawing Figures

MICROPOROUS SHEET MATERIAL, METHOD OF MAKING AND ARTICLES MADE THEREWITH

This is a continuation-in-part application of Ser. No. 416,140 filed Sept. 9, 1982, now abandoned.

TECHNICAL FIELD

The invention relates to microporous material, method of making the same, and articles made therewith.

BACKGROUND ART

Microporous films or membranes have a structure that enables fluids to flow through them. The effective pore size is at least several times the mean free path of the flowing molecules, namely from several micrometers down to about 100 Angstroms. Such sheets are generally opaque, even when made of a transparent material, because the surfaces and the internal structure scatter visible light.

Microporous membranes or films have been utilized in a wide variety of applications such as for the filtration of solids, the ultra filtration of colloidal matter, as diffusion barriers or separators in electrochemical cells, or in the preparation of synthetic leather, and in cloth laminates. The latter utilities require, of course, permeability to water vapor but not liquid water for the applications as synthetic shoes, raincoats, outer wear, camping equipment such as tents, and the like. Microporous films or membranes are often utilized for filter cleaning antibiotics, beer, oils, bacteriological broths, as well as for the analysis of air, microbiological samples, intravenous fluids, vaccines and the like. Microporous membranes or films are also utilized to make surgical dressings, bandages, and in other fluid transmissive medical applications. The microporous membrane or film may be laminated to other articles to make laminates having particular utility. Such laminations may include a microporous layer and an outer shell layer to provide a particularly useful garment material. The microporous films or membranes may be utilized as a tape backing to provide products such as a vapor-transmissive wound dressing or hair set tape.

The art of preparing microporous films or membranes is not restricted, but rather is replete with a wide variety of methods of producing such articles. Methods commonly used to provide microporous films or membranes are described in the following references:

U.K. Patent Application GB No. 2,026,381 A, published February 6, 1980, discloses the preparation of membranes having a porous surface by blending polymer with a liquid component to form a binary two-phase system which, in the liquid aggregate state, has a region of miscibility and a region with miscibility gaps, forming a sheet of the blend in the former state, casting the film into a bath of the liquid component, and removing the liquid component to provide porosity. The resultant non-oriented porous sheet has a relatively low tensile strength.

Various patents assigned to W. L. Gore and Associates, Inc., including U.S. Pat. Nos. 3,953,566; 3,962,153; 4,096,227; 4,110,392; 4,187,390 and 4,194,041, describe the preparation of porous articles, including microporous sheets formed exclusively of polytetrafluoroethylene (PTFE), not a conventional thermoplastic polymer, characterized by having polymer nodes connected by fibrils. Such articles are produced by extruding a paste comprised of PTFE particles and a lubricant, removing the lubricant, and stretching and annealing the resultant product. The resultant product is a sintered, oriented porous film of PTFE.

U.S. Pat. No. 3,201,364, assigned to Monsanto Company, describes the preparation of a non-oriented, non-porous packaging film comprised of a single phase blend of polypropylene and mineral oil.

U.S. Pat. Nos. 4,100,238 and 4,197,148 describe the preparation of microporous films by extruding a two component blend, solvent leaching one dispersed component and stretching the resultant leached film to obtain a desired porosity. The blend consists of polymer and a leachable, non-miscible substance. Once the leachable dispersed phase is removed and the film oriented, a porous film results.

U.S. Pat. No. 3,679,540, assigned to Celanese Corporation, discloses a method for making a microporous polymer film by cold stretching an elastic polymer film until porous surface regions are formed by film failure, hot stretching the cold stretched film until fibrils and pores or open cells are formed and then heat setting the resultant film. Controlled porosity is generally not attained in such films because they do not always uniformly fibrillate to a specific pore size.

Certain U.S. patents disclose the preparation of porous films by blending into the polymer a non-miscible leachable particulate substance such as starch, salts, etc. forming a sheet and leaching the particulate substance from the polymer sheet. Such U.S. patents include U.S. Pat. Nos. 3,214,501 and 3,640,829. U.S. Pat. No. 3,870,593 discloses the preparation of a microporous polymer sheet by blending non-miscible, non-leachable filler into the polymer, forming a sheet of the blend and stretching the sheet to form pores which are initiated at the sites of the filler particles.

U.S. Pat. No. 4,247,498 (Castro) discloses a process for making microporous polymers from blended mixtures of polymer and compatible liquid which are cooled under nonequilibrium thermodynamic conditions to initiate liquid-liquid phase separation. This involves cooling the heated homogeneous solution of polymer and compatible liquid so that a droplet of liquid will form surrounded by liquid polymer. Further cooling produces a solid phase which contains liquid which is removed, forming a structure characterized by a series of enclosed cells having substantially spherical shapes and pores interconnecting adjacent cells.

DISCLOSURE OF INVENTION

Microporous materials according to the present invention are made by the following method steps:

(a) melt blending to form a solution comprising 30 to 80 parts by weight of crystallizable thermoplastic polymer with 70 to 20 parts by weight of compound with which the thermoplastic polymer is miscible and in which the thermoplastic polymer will dissolve at the melting temperature of the thermoplastic polymer and from which the thermoplastic polymer will phase separate on cooling to a temperature at or below the crystallization temperature of the thermoplastic polymer;

(b) forming a shaped article of the melt blended solution;

(c) cooling the shaped article to a temperature at which the thermoplastic polymer crystallizes to cause phase separation to occur between the thermoplastic polymer and the compound thereby to provide an article comprising an aggregate of a first phase comprising particles of crystallized thermoplastic polymer in a second phase comprising the compound with adjacent thermoplastic polymer particles being distinct but having a plurality of zones of continuity; and (d) orienting said article at least in one direction to separate adjacent particles of crystallized thermoplastic polymer from one another to provide a network of interconnected micropores therebetween and to permanently attenuate the thermoplastic polymeric material in the zones of continuity to form fibrils.

The compound may be removed from the article, e.g., by solvent extraction.

The formed article, before orientation, is solid and generally transparent comprising an aggregate of a first phase of particles of crystallized thermoplastic polymer in a second phase of the additive compound. The particles may be described as spherulites and aggregates of spherulites of the polymer with additive compound occupying the space between particles. Adjacent particles of polymer are distinct but they have a plurality of zones of continuity. That is, the polymer particles are generally surrounded or coated by the compound but not completely. There are areas of contact between adjacent polymer particles where phase separation has not occurred and there is a continuum of polymer from one particle to the next adjacent particle in such zones of continuity.

On orienting or stretching, the polymer particles are pulled apart, permanently attenuating the polymer in the zones of continuity thereby forming the fibrils and forming minute voids between coated particles, creating a network of interconnected micropores, thereby rendering the article permanently translucent. On orienting or stretching, the compound remains coated on or surrounds, at least partially, the surfaces of the resultant thermoplastic polymer particles. The degree of coating, of course, depends upon the affinity of the compound for the surface of the polymer particle, whether the compound is a liquid or solid, whether orientation dislodges or disrupts the coating and on other factors which may be relevant. The particles are usually at least partially coated after orientation. Substantially all of the particles appear to be connected by fibrils. The size of the micropores is easily controlled by varying the degree of stretching, percent of additive compound, melt-quench conditions, compound removal and heat-stabilization procedures. The fibrils for the most part do not appear to be broken by stretching but they are permanently stretched beyond their elastic limit so that they do not elastically recover to their original position when the stretching force is released. As used herein, "orienting" means such stretching beyond the elastic limit so as to introduce permanent set or elongation of the article. By contrast, assignee's U.S. Pat. No. 4,206,980 discloses similar films but having fibrils not stretched beyond the elastic limit in order to preserve the reversibly transparent-translucent feature of the films described in the patent.

The article of the invention has a microporous structure characterized by a multiplicity of spaced (i.e. separated from one another), randomly dispersed, nonuniform shaped, equiaxed particles of thermoplastic polymer coated with the compound and connected by fibrils. (Equiaxed means having approximately equal dimensions in all directions.)

The preferred article according to the present invention is in the form of a sheet or film although other article shapes are contemplated. For example, the article may be in the form of a tube or filament. Other shapes which can be made according to the disclosed process are also intended to be within the disclosed invention.

Certain terms are used in the description and the claims that, while for the most part are well known, may require some explanation.

It should be understood that, when referring to the thermoplastic polymer as being "crystallized", this means that it is at least partially crystalline. Crystalline structure in melt processed thermoplastic polymer is well understood by those skilled in the art. It should be further understood that the term "thermoplastic polymer" refers only to conventional polymers which are melt processable under ordinary melt processing conditions. The term "thermoplastic polymer" is not intended to include polymers characterized by including solely perfluoro monomeric units, e.g. perfluoroethylene units, such as polytetrafluoroethylene (PTFE) which, under extreme conditions, may be thermoplastic and rendered melt processable.

The term "melting temperature" refers to the temperature at which the polymer in a blend of polymer and blending compound will melt. The term "crystallization temperature" refers to the temperature at which the polymer in the blend will crystallize. The term "equilibrium melting point" refers to the commonly accepted melting temperature of the pure polymer, as may be available in published references.

The melting and crystallization temperature of a thermoplastic polymer, in the presence of a blending compound or additive, is influenced by both an equilibrium and dynamic effect. At equilibrium between liquid and crystalline polymer, thermodynamics requires that the chemical potentials of the polymer repeating unit in the two phases must be equal. The temperature at which this condition is satisfied is referred to as the melting temperature, which will depend on the composition of the liquid phase. The presence of impurities (such as a blending compound or additive) in the liquid phase will lower the chemical potential of the polymer repeating units in that phase. Therefore, a lower melting temperature is required to re-establish the condition of equilibrium, resulting in what is known as a melting temperature depression.

The crystallization temperature and melting temperature are equivalent at equilibrium. However, at nonequilibrium conditions, which are normally the case, the crystallization temperature and melting temperature are dependent on cooling and heating rate respectively. Consequently, the terms "melting temperature" and "crystallization temperature", when used herein, are intended to include the equilibrium effect of the blending compound or additive as well as the dynamic effect of the rate of heating or cooling.

BRIEF DESCRIPTION OF DRAWINGS

The invention will be further understood by reference to the drawings, wherein.

DETAILED DESCRIPTION OF THE INVENTION

Figure 1:
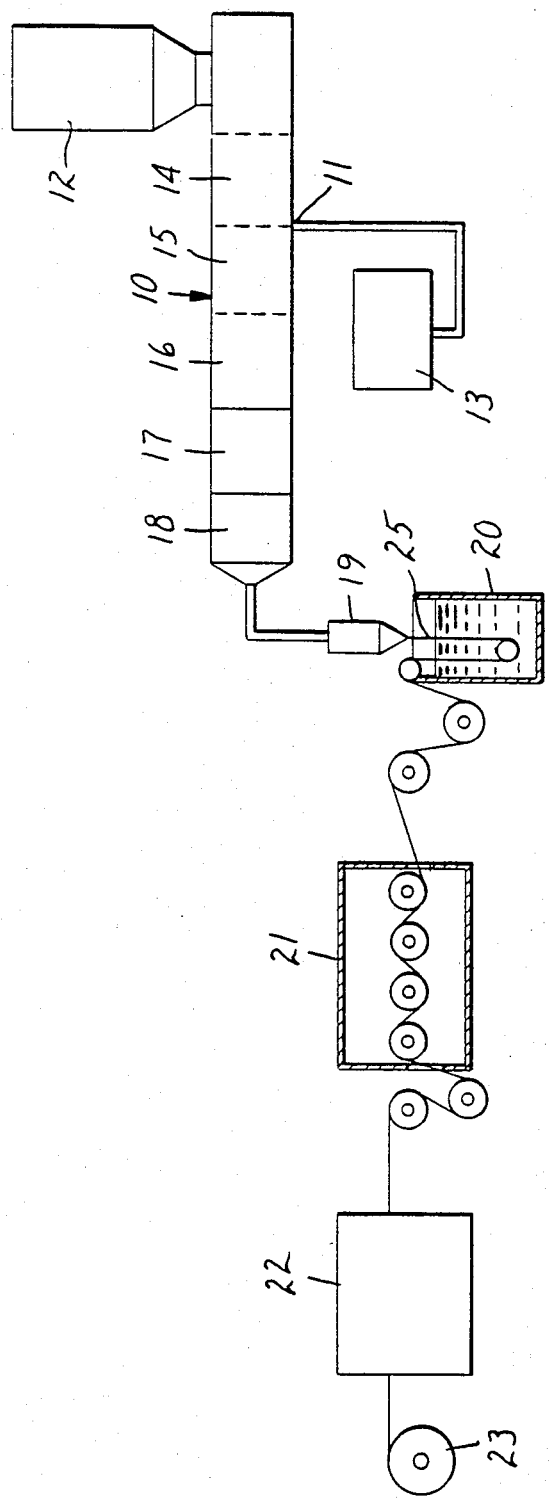
FIG. 1 is a diagrammatical view of an apparatus that may be used in the process of the invention to produce a microporous film according to the invention.
Figure 2:
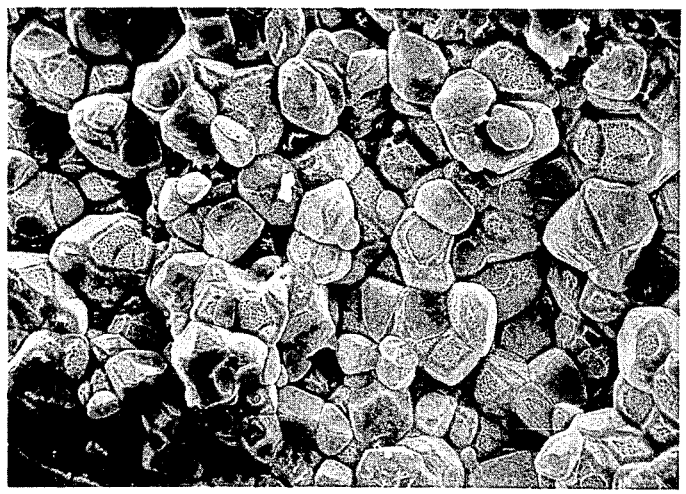
FIG. 2 is a photomicrograph of the internal structure of a 50% machine direction oriented polypropylene microporous sheet according to the present invention at a magnification of 1000×.
Figure 3:
FIGS. 3 and 4 are photomicrographs of the same subject as FIG. 2 except at the higher magnifications of 5000× and 10,000×, respectively, to show more detail.

Crystallizable polymers suitable for use in the preparation of microporous materials of the invention are well known and readily commercially available. The useful polymers are melt processable under conventional processing conditions. That is, on heating they will easily soften and/or melt to permit processing in conventional equipment such as an extruder to form a sheet. Crystallizable polymers, upon cooling their melt under controlled conditions, spontaneously form geometrically regular and ordered chemical structures. Preferred crystallizable polymers for use in the present invention have a high degree of crystallinity and also possess a tensile strength of at least about 70 kg/cm$^2$ (1000 psi).

Examples of suitable crystallizable polymers include addition polymers such as polyolefins and condensation polymers such as polyesters and polyamides. Useful polyolefins preferably include the polymers of ethylene and propylene but also may include 1-octene, styrene, and the like, and copolymers of two or more such olefins that may be polymerized to contain crystalline and amorphous segments and mixtures of stereo-specific modification of such polymers e.g., mixtures of isotactic polypropylene and atactic polypropylene, isotactic polystyrene and atactic polypropylene. Useful polyesters include polyethyleneterephthalate, polybutyleneterephthalate, polyhexamethyleneadipate, polyhexamethylenesuccinate, and polyester copolymers. Useful polyamides include polyhexamethyleneadipamide, polyhexamethylenesebacamide and polycaprolactam. Another useful polymer is polyvinylidene fluoride.

Compounds suitable for blending with the crystallizable polymer to make the microporous materials of the invention are liquids or solids at room temperature and in which the crystallizable polymer will dissolve to form a solution at the melting temperature of the crystallizable polymer but will phase separate on cooling at or below the crystallization temperature of the crystallizable polymer. Preferably, these compounds have a boiling point at atmospheric pressure at least as high as the melting temperature of the crystallizable polymer. Compounds having lower boiling points may be used in those instances where superatmospheric pressure may be employed to elevate the boiling point of the compound to a temperature at least as high as the melting temperature of the crystallizable polymer. Generally, suitable compounds have a solubility parameter and a hydrogen bonding parameter within a few units of the values of these parameters for the crystallizable polymer.

Some examples of blends of crystallizable polymers and blending compounds which are useful in preparing microporous materials according to the present invention include: polypropylene with mineral oil, dioctyl phthalate or mineral spirits; polypropylene-polyethylene copolymer with mineral oil; polyethylene with mineral oil or mineral spirits; polyethylene terephthalate or polybutylene terephthalate with diethylphthalate; polyester elastomer with dioctylphthalate, nylon 6 (polycaprolactam) with triethylene glycol; and polyvinylidene fluoride with dibutyl phthalate.

A particular combination of polymer and blending compound may include more than one polymer, i.e., a mixture of two or more polymers, and/or more than one blending compound. Mineral oil and mineral spirits are examples of mixtures of blending compounds since they are typically blends of hydrocarbon liquids. Blends of liquids and solids may also serve as the blending compound. It should be understood that the polymer may include blended therein certain conventional additive materials in limited quantity so as not to interfere with the formation of the microporous material of the invention and so as not to result in unwanted exuding of the additive. Such additives may include antistatic materials, dyes, plasticizers, UV absorbers, nucleating agents and the like. The amount of additive is typically less than 10% of the weight of the polymer component, preferably less than 2% by weight.

The melt is prepared by mixing 30 to 80% by weight of crystallizable thermoplastic polymer and 70 to 20% by weight of blending compound and heating the mixture to at least the melting temperature of the crystallizable polymer. For ease of handling the melt and in its casting, it is convenient to initiate the formation of the meltblend solution by heating the mixture at a temperature in a range of about 25° C. to about 100° C. above the melting temperature of the crystallizable polymer.

Microporous materials of the invention are prepared by casting a shaped article such as a sheet or layer of a melt-blend solution comprising a crystallizable polymer and a blending compound and, depending on the particular polymer, cooling the article in a quench bath at an appropriate temperature preferably between about 60° C. and 225° C. below the equilibrium melting point of the pure crystallizable polymer to provide a proper cooling rate. (For example for pure polypropylene having an equilibrium melting point of 176° C., a cooling temperature between about 40° C. and 60° C. is employed.) Some minor degree of experimentation may be required to identify the appropriate temperature range which produces optimum phase separation for a particular polymer-blending compound system, this being well within the capability of one skilled in the art once apprised of the present disclosure.

The attainment of the materials of the invention is dependent on the rate of cooling. During cooling, heat is removed from the melt-blend solution until the crystallization temperature of the crystallizable polymer is reached and solidification and phase separation of the polymer can begin. Cooling temperatures greater than about 225° C. below the equilibrium melting point of the pure crystallizable polymer cause too rapid quenching of the melt and can result in single phase films which, although strong and transparent (as taught in the prior art), are substantially incapable of being rendered uniformly microporous by stretching. Cooling at temperatures of less than about 60° C. below the equilibrium melting point of the pure crystallizable polymer allows for too slow a phase separation (crystallization) of the crystallizable polymer with formation of large spherulites that results in articles which are weak. Casting articles or films which are too thick, i.e., thicker than 1,000 micrometers, to achieve the proper cooling rate as described above also allows for too slow a crystallization.

As shown in FIG. 1, generally, the melt-blend solution is obtained by feeding into the hopper 12 of an extruder 10 a mixture of crystallizable polymer and blending compound through the extruder which is heated, preferably with 3 zones 14, 15, 16, respectively heated at increasing temperatures toward the extruder exit 17 to a slot die 19 that has a slit gap of 25 to 1,000 micrometers. Preferably, the crystallizable polymer is fed into the hopper of the extruder and the blending compound is fed by a suitable device 13 into the extruder via a port 11 in the extruder wall intermediate the hopper and the extruder exit 17. It is also preferable to utilize a suitable mixing device such as a static mixer 18 between the extruder exit 17 and the slot die 19. In passing through the extruder, and, where used, the static mixer, the mixture of polymer and blending compound is heated to a temperature at or at least about 25° C. above the melting temperature of the crystallizable polymer (but below the thermal degradation temperature of the polymer) and mixed to form a melt-blend solution that is extruded through the slot die 19 as a layer 25 into a liquid quench bath 20 maintained at a suitable temperature below the crystallization temperature of the crystallizable polymer using a suitable coolant, e.g., water. In some instances, e.g., for nylon and polyester, it is necessary to cool the solution in the extruder before it reaches the die to a temperature as much as 50° C. cooler than the equilibrium melting point of the pure polymer in order to obtain phase separation in the sheet. The cooled film is then led from the quench bath 20, to machine-direction orienting device 21, transverse direction orienting device 22 and then to take-up roller 23. Orienting in two directions is, of course, optional.

The films of the invention possess a tensile strength of at least about 10 kg/cm$^2$, more often 50 kg/cm$^2$ or higher depending on the tensile strength of the crystallizable polymer, the zones of continuity, the extent of orientation, and the process conditions.

The articles are rendered microporous by stretching until micropores are permanently developed or formed, typically to obtain at least an increase in length (elongation) of about 10%. Stretching to provide an elongation of about 10% to about 1,000% is typical. The actual amount of stretching required will depend upon the particular composition of the article and the degree of porosity desired. Stretching may be provided by any suitable device which can provide stretching in at least one direction and may provide stretching both in that direction and in the transverse direction. Stretching should be uniform to obtain uniform and controlled porosity. Stretching in one direction typically causes the film to narrow or "neck" in the cross direction so stretching a film to provide an elongation of 50%, for example, does not produce a 50% increase in the surface area of the film.

The microporous sheet materials of the present invention are preferably dimensionally stabilized according to conventional well known techniques by heating the oriented sheet while it is restrained at a heat stabilizing temperature.

As shown in photomicrographs FIGS. 2-6, the microporous material of the invention is composed of randomly dispersed, equiaxed, irregularly shaped particles of thermoplastic polymer. It should be noted that the blending compound had been removed prior to taking photomicrographs 2-6. Particles are spaced from one another to provide a network of micropores therebetween. Particles are connected to each other by fibrils, shown in detail in FIG. 5, which radiate from each particle to the adjacent particles. The porous structure appearing on the face of some of the particles in photomicrographs 2-5 is not an indication that the particles are porous but instead shows the residue of the fibrils as they retract to the particle once the sheet material is ruptured to reveal the internal structure.

The blending compound may be removed from the microporous sheet to provide a unique microporous sheet material formed of the polymeric material per se. Removal may be by solvent extraction, volatilization, or any other convenient method. Once the blending compound has been removed, the resultant microporous sheet may be imbibed with various materials to provide any of a variety of specific functions, thereby providing unique articles. For example, the imbibing material may be a liquid, solvent solution, solvent dispersion or solid. Such materials may be imbibed by any of a number of known methods which results in the deposition of such materials within the porous structure of the microporous sheet. Some imbibing materials are merely physically placed within the microporous sheet. In some instances, the use of two or more reactive components as the inbibing materials permits the reaction within the microporous sheet structure. Examples of imbibing material include medicaments, fragrances, antistatic agents, surfactants, pesticides and solid particulate material such as activated carbon and pigments. Certain materials, such as antistatic agents or surfactants, may be imbibed without removal of the blending compound.

The microporous sheet material, either before or after removal of the blending compound, may be further modified by the deposition thereon of any of a variety of compositions by any of a variety of known coating or deposition techniques. For example, the microporous sheet material may be coated with metal by vapor deposition or sputtering techniques or it may be coated with adhesives, aqueous or solvent-based coating compositons or dyes. Coating may be accomplished by such other conventional coating techniques as roll coating, spray coating, dip coating or any other known coating techniques. Sheets of the microporous material may be coated, for example, with an antistatic material by conventional wet coating or vapor coating techniques.

The microporous sheet materials of the present invention may be laminated to any of a variety of other structures such as other sheet materials to provide a composite structure which includes the microporous sheet material of the present invention. Lamination can be accomplished by conventional techniques such as adhesive bonding, spot welding, or by other techniques which do not destroy or otherwise interfere with the porosity or create undesirable porosity or perforations.

The microporous materials of the invention may be employed in any of a wide variety of situations where their microporous structures may be utilized. They may be used in the ultrafiltration of colloidal matter, as diffusion barriers or separators in electrochemical cells. They may be laminated to other materials and the laminate may be utilized in many ways, such as to form raincoats or other outer wear, camping equipment such as tents and sleeping bags. The microporous sheet may also be laminated to a woven cloth or non-woven fabric such as a non-woven scrim which may be used to produce a disposable protective garment for use, for example, in a hospital or an electronic clean room or in other areas such as where caustic chemical spills may be a problem. The microporous sheet materials may be utilzed as filtering material for cleaning antibiotics, beer, oils, bacteriological broths and for sample collection in air analysis and to collect microbiological specimens. They may be utilized to make surgical dressings, bandages and in other medical applications. Many other uses for microporous sheets can be found in the literature.

EXAMPLES

The invention is further illustrated by the following examples, wherein all parts are by weight, unless otherwise specified.

EXAMPLE 1

Crystallizable polypropylene (available under the trade designation "Profax" type 6723 from Hercules, Inc.) having a density of 0.903 g/cc, a melt flow index (ASTM D 1238, Condition I) of 0.8 and a melting point of about 176° C. was introduced into the hopper of a 2.5 cm extruder fitted with a 10.16 cm by 0.076 cm slit gap sheeting die positioned above a water quench tank. The polypropylene was fed into the extruder and the extruder operated at a 60 cc/min throughput rate to produce a polypropylene sheet collected at the rate of 7.6 meters per minute. Mineral oil (available under the trade designation "Nujol" from Plough, Inc.) having a boiling point of 200° C. and a standard Saybolt viscosity of 360–390 at 38° C. (about 80 centistokes) was introduced into the extruder through an injection port at a rate to provide a blend of 70% by weight polypropylene and 30% by weight mineral oil. The mixture was cast as a transparent film into the water quench bath which was maintained at 49° C., producing a quenched film at the rate of 7.6 meters per minute. The melt in the extruder and the sheet die was maintained at approximately 245° C. during extrusion. The resulting film was then oriented at room temperature in the machine direction to obtain varying degrees of elongation. The porosity of each film was measured according to ASTM-D-726-58, Method A, by using a Gurley densometer to measure the time in seconds to pass 50 cc of air through the film. Porosity measurement results are reported in Table I.

EXAMPLE 2

A blend of 80% polypropylene and 20% mineral oil (of the same polymer and oil described in Example 1) was extruded as described in Example 1 into a water bath maintained at 49° C. collected at the rate of 7.6 meters per minute while maintaining the temperature of the melt at 245° C. and the film die at the same temperature. Stretching versus porosity results are shown in Table I.

EXAMPLE 3

The system described in Example 1 was used to extrude a blend as described in Example 2 except the quench bath was maintained at 60° C. to produce a film. Evaluation results of the film are shown in Table I.

EXAMPLE 4

Following the conditions described in Example 1, a 60:40 blend of polypropylene:mineral oil was prepared and stretched but found to be unsuitable because the film broke at a lengthwise stretch of less than 10%. The unstretched film had poor integrity and crumbled easily with touch. This example reveals that not all combinations of thermoplastic polymer and blending compound will produce a suitable microporous sheet. The sheet of this example failed due to insufficient internal integrity probably due to insufficient fibril formation.

EXAMPLE 5

A 70:30 polypropylene:mineral oil blend was extruded as described in Example 1 (except the film die was maintained at 260° C.) into a quench bath at 40° C. The film was stretched and its porosity determined. Results are shown in Table I.

EXAMPLE 6

The experiment of Example 5 was repeated except the film die was heated at 275° C. and the water bath maintained at 40° C. The resultant film was stretched and evaluated for porosity with results shown in Table I.

EXAMPLE 7

The experiment of Example 6 was repeated. The porosity was measured after stretching to 35%. The 35% stretched film was then restrained and heat set in an oven for 5 minutes at 107° C. and its porosity was then measured. The film was given another 5 minutes under restraint in the oven at 107° C. and its porosity was measured again. The film was then washed with toluene while restrained to remove mineral oil and dried in an oven at 107° C. and its porosity measured again. The result of each of the measurements is shown in Table I as Examples 7, 7a, 7b, and 7c, respectively.

EXAMPLE 8

A 60:40 blend of high density polyethylene having a density of 0.946 g/cc and a melt-flow index of 3.0 (Condition E) (available under the trade designation "Marlex" 6030 from Phillips Petroleum Company) and mineral oil ("Nujol") was extruded in the same manner as described in Example 1 to produce a film which was in line lengthwise stretched 50% and collected. The resultant film was further machine direction stretched while in a stretching apparatus and its porosity measured with results being shown in Table I as Example 8.

This film was then washed while under restraint with toluene to remove the mineral oil, air dried and its porosity measured. The results, identified under Example 8a are shown in Table I.

The film of Example 8a was heat annealed for 10 minutes at 93° C. and then, after cooling, the air permeability measured. Results are shown in Table I under Example 8b.

The film described in Example 8b was cross stretched approximately 30% and the porosity measured with results shown in Table I under Example 8c.

EXAMPLE 9

A film was prepared from a melt blend of 70 parts polyethylene-polypropylene copolymer (available under the trade designation "Shell" copoly P 6313) and 30 parts mineral oil as described in Example 1 under the same conditions. The resultant transparent film was mounted in a stretching apparatus, stretched 50% in the lengthwise direction, washed with toluene while restrained at ambient temperature and heat set at 107° C. for 10 minutes. The porosity before stretching, solvent washing and annealing was not measurable by ASTM-D-726-58, Method A, due to insufficient porosity. The porosity after this treatment was 415.8 seconds.

EXAMPLE 10

The microporous films of Examples 1, 2, 5, 6 and 8c were tested for moisture vapor transmission by comparing the moisture evaporation or transmission rate of water from an open jar and with each of the tests samples applied over the jar opening. The open jar was considered to have a 100% moisture transmission rate and the relative transmission rate of each of the film samples is compared to the transmission rate of the open jar. Ambient conditions were used, i.e., approximately 21° C. at 50% relative humidity. Results are shown in Table II. The moisture vapor transmission rate of two commercially available microporous films available under the trade designation "Celgard" from the Celanese Company were also evaluated and the results are also reported in Table II.

EXAMPLE 11

A film as described in Example 1 was prepared with the exception that it was stretched 50% in line lengthwise and its width stretched 50% in line. The film was measured for porosity and moisture vapor transmission, as in Example 10, without removing the mineral oil, and then with the oil removed by washing with toluene. Results are:

| Ex. No. | MVT % ($g/m^2$/24 hrs.) | MVT % | Porosity (Seconds to pass 50 cc of air) |
|---|---|---|---|
| 11 | 1102.8 | 76 | 48.1 |
| 11a | 1131.8 | 78 | 25.8 |

EXAMPLE 12

A 70:30 blend of polypropylene:dioctyl phthalate was extruded to form a film as described in Example 1 except the temperature of the melt was 260° C. and the water quench temperature was maintained at 60° C. The film was lengthwise stretched 65% in a stretching apparatus and found to have an air porosity of 1155.3 seconds.

The stretched film described above was washed with methyl ethyl ketone solvent to remove the dioctyl phthalate and air dried. This film had an air porosity of 840.4 seconds.

The film described above was annealed for 10 minutes at 107° C. under restraint and its air porosity found to be 713.9 seconds.

EXAMPLE 13

The 70:30 blend of polypropylene:mineral oil described in Example 1 was formed into a sheet as described except the molten blend was cast onto a casting wheel maintained at 30° C. The resultant transparent film was in line length stretched 50% resulting in an opaque film which was measured for air porosity and moisture transmission. The film had no apparent air porosity and had a moisture vapor transmission of 330 $g/m^2$/24 hrs. or 23%. This film had a unique physical structure, unlike the films of the previous examples which have an open or porous structure on both surfaces and throughout the film. This film had a porous structure on one side and approximately 75% through the thickness of the film, whereas the other side and the remaining 25% of the thickness had a fused or compressed structure. This fused or sealed side of the film had contacted the casting wheel upon exiting the film die. The porous side of the film could be marked with a felt-tipped marking pen whereas the smooth opposite side could not easily be marked and, when markings were placed on the smooth side, they smeared or wiped off easily. Films with such properties can be used as protective films or tapes, either for the resistance to marking or, by reversing the film to use the opposite side, for ready markability, or for ultrafiltration.

EXAMPLE 14

A 70:30 blend of polyester copolymer (available under the trade designation "Hytrel" 6346) and dioctyl phthalate was pelletized using a Baker Perkins twin screw compounder. ("Hytrel" is the trade designation of a polyester elastomeric block copolymer of short chain diol terephthalate and long chain polyether diol terephthalate manufactured by the E. I. DuPont company.) The pellets were extruded as described in Example 1, except that no other dioctyl phthalate was injected into the system and the temperature of the melt was maintained at 274° C. and the water quench bath was maintained at 55° C. The resulting transparent film was mounted in a length stretching apparatus and stretched 40%. The stretched film was washed with methyl ethyl ketone solvent to remove the dioctyl phthalate and its air porosity measured, after drying. The air porosity was 15,350 seconds. The film was then stretched in the cross direction 40% and then found to have a porosity of 7,255 seconds.

EXAMPLE 15

Nylon 6 (available from the Foster Grant Company under the trade designation "FOSTA" Number 471) was extruded through the 2.5 cm extruder while triethylene glycol was injected into the extruder barrel to provide a 60:40 nylon 6:triethylene glycol blend which was cast from a 10.16 cm by 0.076 cm slit gap sheeting die heated at 220° C. and cast into a water quench bath at the rate of 5.2 meters per minute with the water bath being maintained at 44° C. The temperature of the melt blend in the extruder was maintained at 220° C. The film usually cast was transparent although, as some of the triethylene glycol was removed by the water in the quench bath, the film assumed a slightly opaque appearance on drying. As the glycol dissipated, the film became completely opaque. The dried film was stretched lengthwise 30% and the air porosity found to be 350 seconds.

EXAMPLE 16

A film was prepared of the blend described in Example 8, length stretched 35% in a stretching apparatus, and found to have a porosity of 848.1 seconds. The film was then solvent washed in isopropanol while restrained to remove oil, air dried and found to have a porosity of 130.3 seconds. The film was heated to 93.3° C. for 5 minutes in the stretching apparatus and found to have an air porosity of 71.8 seconds. The film was then cross stretched 30% and found to have a porosity of 34 seconds.

A similar freshly formed film as described above was washed in isopropyl alcohol and, after drying, found to have a porosity of 835.7 seconds. The film was length stretched 35% and found to have a porosity of 211.4 seconds. Upon heat treating the stretched film at 93.3° C. for 5 minutes, its porosity was found to be 111.8 seconds. The same film cross stretched 30% had an air porosity of 32.3 seconds.

EXAMPLE 17

A 60:40 blend of high density polyethylene available from Atlantic Richfield Co. under the trade designation "Arco" 8590 having a density of 0.955 and a melt flow index of 11.0 (Condition E) and mineral oil ("Nujol") was melt mixed in an extruder, cast from a 10.16 cm by 0.06 cm slit gap sheeting die at a temperature of 126.7° C. (approximately 10° C. below the melting point of the pure polymer) into a water quench bath maintained at 48° C. and collected at the rate of 7.6 meters per minute. The resulting transparent film was length stretched 25% and solvent extracted with isopropyl alcohol to remove mineral oil to produce a microporous film having a porosity of 595 seconds. The microporous film was cross stretched 25% and its air porosity found to be 193 seconds. After heat treatment at 93.3° C. for 5 minutes, the porosity was 192 seconds.

EXAMPLE 18

A 65:35 blend of polypropylene (available under the trade designation "Profax" 6330 having a density of 0.90 g/cc and a melt flow index of 12.0, Condition I):-mineral oil ("Nujol") was melt mixed in the extruder, cast from a 10.06 cm by 0.06 cm slit gap sheeting die at a temperature of 164° C., approximately 10° C. below melt point of the pure polymer, into a water quench bath maintained at 45° C. and collected at 7.3 meters per minute. The resulting transparent film was cross stretched 30% and washed with isopropyl alcohol to remove mineral oil, producing a microporous film having a porosity of 1170 seconds.

EXAMPLE 19

A 55:45 blend of polyethylene terephthalate having an intrinsic viscosity of 0.6 and a density of 1.37 g/cc and diethyl phthalate was melt blended and extruded using the apparatus described in Example 1 except the extrusion orifice was 10.16 cm by 0.06 cm and the temperature of the melt was 215° C., approximately 50° C. below the melting point of the pure polymer. The water quench bath was maintained at 40° C. and the film collected at 3.66 meters per minute. the resulting transparent film was stretched 20% in the lengthwise direction under ambient conditions and 20% in the cross direction, washed in isopropyl alcohol to remove the diethyl phthalate, dried and found to have a porosity of 7675 seconds.

EXAMPLE 20

A 70:30 blend of polybutylene terephthalate (available from Eastman Chemical Company under the trade designation "Tenite" 6-P4D) and diethyl phthalate was melt mixed in the extruder, cast from a 10.16 cm by 0.06 cm slit gap sheeting die at a temperature of 224° C., approximately at the melting point of the pure polymer, into a water quench bath maintained at 60° C. and collected at 6.7 meters per minute. The resulting transparent film was stretched under ambient conditions in the length and cross directions 20% and washed in toluene to remove the diethyl phthalate. The resulting microporous film had a porosity of 2,735 seconds.

EXAMPLE 21

The 30:70 blend of high density polyethylene having a density of 0.955 and a melt flow index of 11.0, Condition E (available under the trade designation "Arco" 8590):mineral oil ("Nujol") was melt mixed in the extruder at 254° C. and cast from the 10.16 cm by 0.06 cm slit of the sheeting die at a temperature of 271° C. into quench water maintained at 54° C. and collected at the rate of 7.62 meters per minute. The resultant transparent film was washed with toluene to remove the mineral oil and the film was stretched 35% in the machine direction and cross stretched 25%. The resultant stretched microporous film had a porosity of 4.8 seconds.

EXAMPLE 22

A 60:40 blend of polyvinylidene fluoride (having a density of 1.75 g/cc and being available from Pennwalt Chemicals Company under the trade designation "Kynar" 740) and dibutyl phthalate was melt mixed in a twin screw extruder at 250° C. and cast from a 15.24 cm by 0.06 cm slit, sheeting die heated at 260° C. into a 32° C. water bath to produce a film which was collected at the rate of 7.62 meters per minute. The resultant transparent film was washed with 1,1,1-trichloroethane, biaxially stretched 10% in each direction and its air porosity found to be 1,099 seconds. The moisture vapor transmission was found to be 25%.

TABLE I

| Length Increase (%) | POROSITY (SEC TO PASS 50 cc AIR) Example No. | | | | | | | | | | | | | |
|---|---|---|---|---|---|---|---|---|---|---|---|---|---|---|
| | 1 | 2 | 3 | 4 | 5 | 6 | 7 | 7a | 7b | 7c | 8 | 8a | 8b | 8c |
| 0 | * | | | | | | | | | | | | | |
| 5. | | | | | | | | | | | | | | |
| 10. | 3760.0 | | | | 638.3 | 508.7 | 472.1 | | | | | | | |
| 15. | | | | | | | | | | | | | | |
| 20. | | | | | | | | | | | | | | |
| 25. | 710.2 | | 814.5 | | 128.9 | 73.2 | 68.8 | | | | | | | |
| 30. | 572.4 | | | | 73.6 | | | | | | | | | |
| 35. | 499.5 | | | | 60.4 | 41.5 | 35.4 | 21.7 | 21.6 | 15.8 | | | | |
| 40. | 451.2 | | 475.1 | | 54.3 | 36.2 | | | | | | | | |
| 45. | 421.4 | | | | 50.5 | 32.0 | | | | | | 471.7 | | |

TABLE I-continued

| Length Increase (%) | POROSITY (SEC TO PASS 50 cc AIR) Example No. | | | | | | | | | | | | | |
|---|---|---|---|---|---|---|---|---|---|---|---|---|---|---|
| | 1 | 2 | 3 | 4 | 5 | 6 | 7 | 7a | 7b | 7c | 8 | 8a | 8b | 8c |
| 50. | 398.2 | | 411.2 | | 43.4 | 24.8 | | | | | | | | |
| 55. | | | | | | 21.4 | | | | | 369.1 | | | |
| 60. | 354.4 | | 348.9 | | | 19.5 | | | | | | | | |
| 65. | 337.8 | | | | | 16.5 | | | | | 366.4 | 106.5 | 67.0 | 20.7 |
| 70. | 350.5 | | 333.6 | | | | | | | | | | | |
| 75. | | | | | | | | | | | | | | |
| 80. | 277.1 | | | | | | | | | | | | | |
| 85. | 324.2 | | 326.4 | | | | | | | | | | | |
| 90. | 376.5 | | | | | | | | | | | | | |
| 95. | - | | 298.1 | | | | | | | | | | | |
| 100. | 406.7 | 10,000 | 311.2 | | | | | | | | | | | |
| 110. | 465.9 | | | | | | | | | | | | | |
| 120. | 416.8 | | | | | | | | | | | | | |
| 130. | 493.7 | | 317.4 | | | | | | | | | | | |
| 140. | 443.1 | | | | | | | | | | | | | |
| 150. | | | | | | | | | | | | | | |
| 160. | 620.9 | | | | | | | | | | | | | |

*No measurable air porosity by ASTM-D-726-58

TABLE II

| | gm $H_2O/m^2/24$ hrs. | Moisture Vapor Transmission (%) | Length Increase (Machine direction) (%) | Length Increase (Transverse direction) (%) |
|---|---|---|---|---|
| Open jar H$_2$O | 1451.0 | 100.0 | — | |
| Example 1 | — | 0.0 | 0. | |
| Example 2 | 842 | 58.0 | 100. | |
| Example 5 | 896.3 | 62.0 | 50. | |
| Example 6 | 1023.0 | 70.5 | 65. | |
| Example 8c | 856.1 | 59.0 | 65. | 30. |
| Example 11 | 1102.8 | 76.0 | 50. | 50. |
| Example 11a | 1131.8 | 78.0 | 50. | 50. |
| "Celgard" 2400 | 972.1 | 67.0 | — | |
| "Celgard" 2500 | 1117.3 | 77.0 | — | |

"Celgard" is a Celanese Corp. registered trademark for porous films

EXAMPLE 23

A 48:52 blend of high density polyethylene having a melt flow index of 0.07 (ASTM Condition E) available under the trade designation "GM 9255" from American Hoechst Company and mineral oil available under the trade designation Amoco White Mineral oil #31 USP grade having a (Brookfield viscosity of 139 centipoise as per ASTM D 1824 Model LVT, Spindle #1, 30 rpm, 22° C.) was extruded at the rate of 19-38 kg/hr using a twin screw extruder fitted with a film die having a gap of 0.038 cm into a 26° C. water quench bath. Two sheets were extruded, one at a temperature of about 250° C., producing a 76 micrometer sheet, and of about 204° C., producing a 104 micrometer sheet.

Thereafter, the film was solvent extracted with 1,1,1-trichloroethane to remove the oil and stretched, both in the machine direction and transverse direction, to the degree specified in Table III below. Machine direction stretching was at 65° C. and transverse stretching was at a temperature in the range of about 66° C. to 105° C. Each of the stretched film samples had a moisture vapor transmission according to the inverted cup method described in ASTM E 96-80 of 15,000 grams of water/m$^2$/24 hours. Other physical properties of the films are set forth in Table III.

TABLE III

| Thickness | | % Stretch | | Tensile Strength at Break* | | Air Permeability (Gurley) sec/50 cc |
|---|---|---|---|---|---|---|
| Start Micrometers | Finish Micrometers | Machine Direction | Cross Direction | Machine Direction (g) | Cross Direction (g) | |
| 76 | 58 | 100 | 100 | 188 | 265 | 16.4 |
| 76 | 48 | 200 | 200 | 195 | 145 | 12.3 |
| 104 | 84 | 100 | 100 | 315 | 266 | 17.4 |
| 104 | 61 | 200 | 200 | 318 | 590 | 15.5 |

*Measured by ASTM D638-80 Type IV die, crosshead speed 25.4 cm/min, jaw gap 7.6 cm

EXAMPLE 24

A 44:56 melt blend of high density polyethylene having a Condition E ASTM melt flow index of 0.05 and available under the trade designation "ARCO" 6000 HDPE and mineral oil ("Nujol") was extruded onto a casting wheel. The wheel was held at 50° C. and the temperature of the melt was 254° C., producing a 120 μm film. The film was mounted in a stretching apparatus where the mineral oil was removed with 1,1,1-trichloroethane and dried at room temperature. The film was then length oriented. Marks were made on the film, before stretching, 1.0 cm apart. After stretching the marks were 11.0 cm apart, resulting in a total length orientation of 1000% (10:1). The air permeability was measured at 3515 seconds.

EXAMPLE 25

A blend of 45% polypropylene and 55% mineral oil (of the same polymer and oil described in Example 1) was extruded with a temperature of the melt of 155° C., as described in Example 1, into a water bath maintained at 45° C. The quenched sheet was length oriented at room temperature 10%, washed in 1,1,1-trichloroethane, producing a porous film having an air permeability of 261 seconds.

EXAMPLE 26

A blend of 70% high density polyethylene ("Marlex" BX672, density of 0.965 g/cc and a melt flow index of 6.5 Condition E) and 30% mineral oil was extruded at a temperature of the melt of 260° C., as described in Example 1, into a water bath maintained at 64° C. The quenched sheet was washed in 1,1,1-trichloroethane, length oriented at room temperature 25%, producing a porous film having an air permeability of 110 seconds.

I claim:

1. A method of making a microporous article, comprising:
   (a) melt blending to form a solution comprising 30 to 80 parts by weight of crystallizable thermoplastic polymer with 70 to 20 parts by weight of a compound with which said thermoplastic polymer is miscible and in which said thermoplastic polymer will dissolve at the melting temperature of said thermoplastic polymer but which will phase separate on cooling to a temperature at or below the crystallization temperature of said thermoplastic polymer;
   (b) forming a shaped article of the melt blended solution;
   (c) cooling said shaped article to a temperature at which said thermoplastic polymer crystallizes to cause phase separation to occur between said compound and said polymer thereby to provide an article comprising an aggregate of a first phase comprising particles of crystallized thermoplastic polymer in a second phase comprising said compound with adjacent thermoplastic polymer particles being distinct but having a plurality of zones of continuity; and
   (d) orienting said article at least in one direction to separate adjacent particles of thermoplastic polymer from one another to provide a network of interconnected micropores therebetween and to permanently attenuate the thermoplastic polymeric material in said zones of continuity to form fibrils.

2. The method of claim 1 wherein said melt blend solution is formed at a temperature in a range from approximately 50° C. below the equilibrium melting point of said pure thermoplastic polymer to a temperature above the equilibrium melting point but below the thermal degradation temperature of said thermoplastic polymer and of said compound.

3. The method of claim 1 wherein said cooling comprises immersing said shaped article into a liquid cooling medium.

4. The method of claim 1 wherein said cooling comprises casting said shaped article onto a casting wheel.

5. The method of claim 1 wherein said orienting is biaxial orienting.

6. The method of claim 1 wherein said orienting provides a length increase in said article of from about 10 to about 1,000 percent of the original length of said article.

7. The method of claim 1 comprising the additional step of removing said compound.

8. The method of claim 7 wherein said compound is solvent-soluble and said removing is by solvent extraction.

9. The method of claim 7 wherein said compound is volatile and said removing is by volatilization of said compound.

10. The method of claim 1 comprising the additional step of dimensionally stabilizing said article by heating the oriented article, while it is restrained, to a heat stabilizing temperature.

11. The method of claims 1, 5, 6 or 10 comprising the additional step of laminating said microporous article to a second article.

12. The method of claim 1 wherein said thermoplastic polymer and said compound are selected from the group consisting of
   (a) polypropylene with mineral oil, dioctylphthalate or mineral spirits;
   (b) polyethylene with mineral oil or mineral spirits;
   (c) polypropylene-polyethylene copolymer with mineral oil;
   (d) polyethylene terephthalate with diethylphthalate;
   (e) polycaprolactam with triethylene glycol;
   (f) polyvinylidene fluoride with dibutyl phthalate;
   (g) polybutylene terephthalate with diethylphthalate; and
   (h) polyester copolymer with dioctylphthalate.

13. The method of claim 1 wherein said crystallizable thermoplastic polymer has a tensile strength of at least 70 kg/cm$^2$.

14. A microporous material comprising about 30 to 80 parts by weight of crystallizable thermoplastic polymer and about 70 to 20 parts by weight of a compound with which said thermoplastic polymer is miscible and in which said thermoplastic polymer will dissolve at the melting temperature of said thermoplastic polymer but will phase separate on cooling to a temperature at or below the crystallization temperature of said thermoplastic polymer, said microporous material having an internal structure characterized by a multiplicity of spaced, randomly dispersed, non-uniform shaped, equiaxed particles of said thermoplastic polymer coated with said compound, adjacent coated particles throughout said material being separated from one another to provide said material with a network of interconnected micropores and said adjacent thermoplastic polymer particles being connected to each other by a plurality of fibrils consisting of said thermoplastic polymer.

15. The material of claim 14 in which the crystallizable thermoplastic polymer has a tensile strength of at least 70 kg/cm$^2$.

16. A laminated structure comprising the microporous material of claim 14 and at least one other material.

17. The microporous material of claim 14 wherein said thermoplastic polymer and said compound are selected from the group consisting of
   (a) polypropylene with mineral oil, dioctylphthalate or mineral spirits;
   (b) polyethylene with mineral oil or mineral spirits;
   (c) polypropylene-polyethylene copolymer with mineral oil;
   (d) polyethylene terephthalate with diethylphthalate;
   (e) polycaprolactam with triethylene glycol;
   (f) polyvinylidene fluoride with dibutyl phthalate;
   (g) polybutylene terephthalate with diethylphthalate; and
   (h) polyester copolymer with dioctylphthalate.

18. A microporous material comprising crystallizable thermoplastic polymer, said microporous material having an internal structure characterized by a multiplicity of spaced, randomly disposed, non-uniform shaped, equiaxed particles of said thermoplastic polymer, adjacent particles throughout said material being separated from one another to provide said material with a network of interconnected micropores and being connected to each other by a plurality of fibrils consisting of said thermoplastic polymer.

19. A laminated structure comprising the microporous material of claim 18 and at least one other material.

20. The method of claims 1 or 7 comprising the additional step of imbibing the microporous material with an imbibing material.

21. The method of claims 1 or 7 comprising the additional step of coating the resultant microporous material.

22. The microporous material of claims 14 and 18 containing an additional substance which at least partially fills said micropores.

23. The microporous material of claims 14 or 18 coated with a coating material.

24. The coated microporous material of claim 23 wherein said coating material is vapor deposited metal.

25. The method of claim 1 wherein said thermoplastic polymer is polyethylene.

26. The microporous material of claims 14 or 18 wherein said thermoplastic material is polyethylene.

27. The method of claim 1 wherein said article is a sheet.

28. The microporous material of claims 14 or 18 in the shape of a sheet.

29. A sheet material having a microporous structure extending to one major surface characterized by a multiplicity of spaced, randomly disposed, non-uniform shaped, equiaxed particles of thermoplastic polymer, adjacent particles throughout said microporous structure being separated from one another to provide said microporous structure with a network of interconnected micropores and being connected to each other by a plurality of fibrils consisting of said thermoplastic polymer and an opposite major surface comprised of said polymer but not having said microporous structure.

* * * * *

UNITED STATES PATENT AND TRADEMARK OFFICE
CERTIFICATE OF CORRECTION

PATENT NO. : 4,539,256

DATED : September 3, 1985

INVENTOR(S) : Gene H. Shipman

It is certified that error appears in the above-identified patent and that said Letters Patent is hereby corrected as shown below:

In the Specification:

Col. 6, line 33, "meltblend" should read --melt-blend--.

Col. 15, Table I, the length percent (%) of 80, 85, 90 and 95 for examples 1 and 3 should read as per attached sheet.

Claim 22, line 1, "14 and 18" should read --14 or 18--.

Figure 4:
Figure 5:
FIG. 5 is a photomicrograph of the same subject as FIG. 2 showing the left half at a magnification of 5,000× and having a portion of the left half (identified by a small rectangular border within the left half) further enlarged to a magnification of 25,000× presented as the right half of this FIGURE to show further detail of the fibrils between particles in the sheet material.
Figure 6:
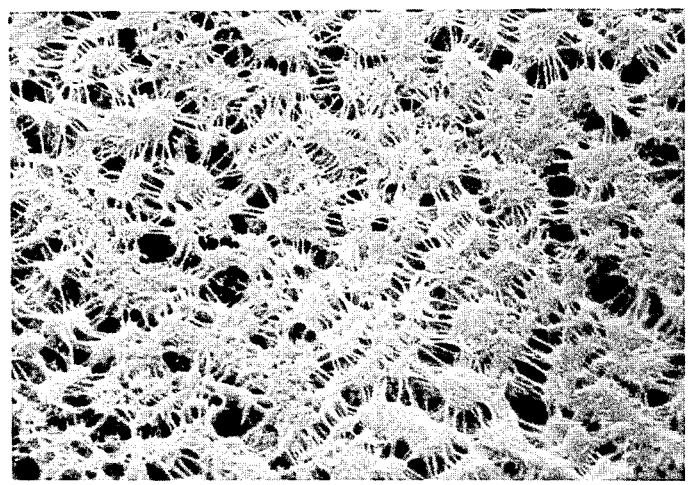
FIG. 6 is a photomicrograph of the surface of a polyethylene biaxially oriented microporous sheet material according to the present invention at a magnification of 5000×.
Figure 4:
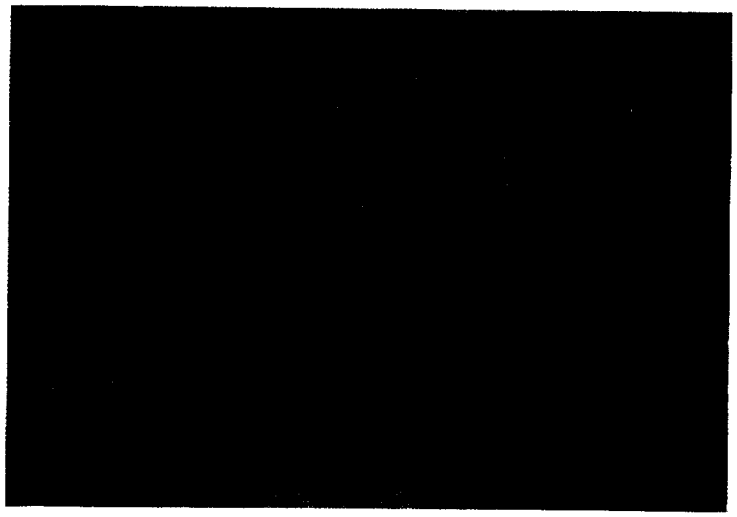
Figure 5:
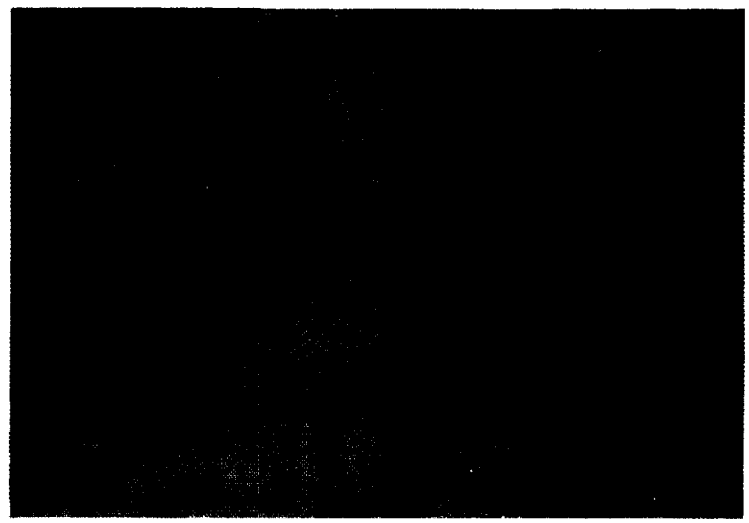

In the Drawings:

Figs. 4 and 5 should be deleted to appear as per attached sheet.

Signed and Sealed this

Twenty-fourth Day of December 1985

[SEAL]

Attest:

DONALD J. QUIGG

Attesting Officer     Commissioner of Patents and Trademarks

UNITED STATES PATENT AND TRADEMARK OFFICE
CERTIFICATE OF CORRECTION

PATENT NO. : 4,539,256

DATED : September 3, 1985

INVENTOR(S) : Gene H. Shipman

It is certified that error appears in the above-identified patent and that said Letters Patent is hereby corrected as shown below:

| | | |
|---|---|---|
| 50. | 398.2 | 411.2 |
| 55. | | |
| 60. | 354.4 | 348.9 |
| 65. | 337.8 | |
| 70. | 350.5 | 333.6 |
| 75. | 277.1 | |
| 80. | 324.2 | 326.4 |
| 85. | 376.5 | |
| 90. | | 298.1 |
| 95. | | |

15

| Length Increase (%) | 1 | 2 | 3 |
|---|---|---|---|
| 50 | 398.2 | | 411.2 |
| 55 | | | |
| 60 | 354.4 | | 348.9 |
| 65 | 337.8 | | |
| 70 | 350.5 | | 333.6 |
| 75 | | | |
| 80 | 277.1 | | |
| 85 | 324.2 | | 326.4 |
| 90 | 376.5 | | |
| 95 | | | 298.1 |